US012704651B2

(12) United States Patent
Diggins et al.

(10) Patent No.: US 12,704,651 B2
(45) Date of Patent: Aug. 11, 2026

(54) SEISMIC DATA PROCESSING METHOD FOR RESOLVING THE NEAR-SURFACE IN THE PRESENCE OF VELOCITY INVERSIONS

(71) Applicant: DUG Technology (Australia) Pty Ltd., West Perth (AU)

(72) Inventors: Charles F. Diggins, Louisville, CO (US); Gary Hampson, Peppermint Cove (AU)

(73) Assignee: DUG Technology (Australia) Pty Ltd., West Perth (AU)

( * ) Notice: Subject to any disclaimer, the term of this patent is extended or adjusted under 35 U.S.C. 154(b) by 654 days.

(21) Appl. No.: 17/858,926

(22) Filed: Jul. 6, 2022

(65) Prior Publication Data

US 2022/0373704 A1 Nov. 24, 2022

Related U.S. Application Data

(63) Continuation of application No. PCT/US2021/012539, filed on Jan. 7, 2021.

(60) Provisional application No. 62/957,881, filed on Jan. 7, 2020.

(51) Int. Cl.
*G01V 1/30* (2006.01)
*G01V 1/28* (2006.01)

(52) U.S. Cl.
CPC .............. *G01V 1/305* (2013.01); *G01V 1/282* (2013.01)

(58) Field of Classification Search
CPC ............................... G01V 1/305; G01V 1/282
See application file for complete search history.

(56) References Cited

U.S. PATENT DOCUMENTS 5,996,414 A * 12/1999 Mercado ................ E02D 33/00 73/594
2004/0015296 A1 * 1/2004 Causse .................. G01V 1/305 702/14
2012/0043091 A1 * 2/2012 Leahy .................... G01V 1/282 166/369
2012/0143506 A1 * 6/2012 Routh .................... G01V 1/282 702/2
2016/0377751 A1 * 12/2016 De Meersman ....... G01V 1/364 702/16
2017/0168177 A1 * 6/2017 Wang ..................... G01V 1/282
2019/0195067 A1 * 6/2019 Colombo ................ E21B 49/00
2019/0324167 A1 * 10/2019 Zhang ..................... G06F 17/18

OTHER PUBLICATIONS

Examination Report under Section 18(3) dated Jul. 18, 2023, for United Kingdom Application No. GB2209188.8.
International Search Report and Written Opinion, International Application No. PCT/US2021/012539 dated Apr. 12, 2021.

* cited by examiner

*Primary Examiner* — Catherine T. Rastovski
*Assistant Examiner* — Nyla Gavia
(74) *Attorney, Agent, or Firm* — Richard A. Fagin

(57) ABSTRACT

A method for weathered layer correction of seismic data includes identifying arrival times in the seismic data corresponding to a weathered layer velocity gradient. A velocity model of the weathered layer is generated using the arrival times. The seismic data are time adjusted using the velocity model.

21 Claims, 9 Drawing Sheets

SEISMIC DATA PROCESSING METHOD FOR RESOLVING THE NEAR-SURFACE IN THE PRESENCE OF VELOCITY INVERSIONS

CROSS REFERENCE TO RELATED APPLICATIONS

Continuation of International Application No. PCT/US2021/012539 filed on Jan. 7, 2021. Priority is claimed from U.S. Provisional Application No. 62/957,881 filed on Jan. 7, 2020. Both the foregoing applications are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of seismic exploration of the Earth's subsurface. More particularly, the disclosure relates to methods for enhancing seismic images of the subsurface in the presence of formation layers near the surface having anomalous seismic velocities.

Seismic data, in particular but not exclusively those acquired on land, are known to exhibit "refractor shingling." Refractor shingling is a common geophysical term to describe "stringers" consisting of relatively thin, high seismic velocity layers embedded in a slower medium called the Weathering Velocity Matrix (VwMatrix). In seismic exploration, "shingling" usually refers to a "Christmas-tree" pattern of first event arrivals in a visual display (called a "shot record") of seismic signals. (See, Sun and Zhang, 2013).

When shingling is observed on seismic shot records, it is usually considered noise in the sense that events in the shot record resulting from the stringers (shingles) are not treated as usable information. Zhang and Wang (2018) describe machine learning methods for automatically recognizing the existence of shingling for the purpose of avoiding using such events in seismic image processing to enhance images of the deeper subsurface.

An example of the appearance of shingling is shown in FIG. 1, which illustrates an example of a "Christmas-tree" pattern of shingles. Such appearance is consistent with a thick sequence of alternating thin, high velocity layers and low velocity layers in the shallow subsurface. The shot record illustration in FIG. 1 is known as a "common shot gather" wherein all seismic data records associated with one actuation of a seismic energy source are collected in a display with the horizontal coordinate representing distance of the respective seismic sensor from the seismic energy source, and the vertical coordinate representing time elapsed after actuation of the seismic energy source.

These thin layers, sometimes called "stringers" or "sills", may consist of, for example, basalts, limestones, and anhydrites (e.g., as may be present in the Permian Basin of West Texas, U.S.A.). Because the stringers are underlain by slower seismic velocity layers, they generate velocity inversions (reduction in velocity below the stringer), wherein the normal trend of seismic velocity is increasing velocity with respect to depth in the subsurface. Velocity inversions manifest as "hidden layers" and may only be indirectly observable in refracted seismic event arrivals as gaps between shingles (See, Banerjee and Gupta, 1975).

A way to understand a near-surface shot record (section) which contains thin, high-velocity beds (stringers) is as a thick ("thick" being compared with the thickness of the stringer(s)) matrix of monotonically increasing "slower" velocity formations with respect to depth, with a few embedded, thin higher-velocity layers.

Methods known in the art for seismic data processing in the presence of shingling include the following: identify and attempt to use the shingling by event arrivals; and avoid the effect of the shingles by using only seismic data beyond them in data processing.

FIG. 2 shows the common shot gather shown in FIG. 1 with shingling identified by arrival time of an event in the traces of the gather. FIG. 3 shows the same seismic data of FIG. 2 rearranged into a "common offset" gather. When observing the same trace in FIGS. 2 and 3 at 700 meters offset, it can be observed that the source location is at the edge of a "jebel" (a term used to describe a mountain or hill in North Africa) with embedded high-velocity stringers. It can also be expected that the identified shingle event arrivals will not predict the jebel's effect on the statics (time changes due to such velocity variations in the near subsurface). This is because the shingle events are too shallow in time and will not reflect the jebel's time thickness effects in the later in time (underlying) seismic data.

Because refraction statics is usually considered a first-break driven process, shingling is often picked and a turning-ray tomography ("tomo") solution is performed incorporating such high-velocity stringers. However, it is well known that turning-ray tomography used by modern refraction statics methods does not honor inversions, so shingled picks may not result in an accurate depth model of seismic velocity. Thus, even if the shingled first breaks could be picked accurately and consistently, they are simply not appropriate as input to a tomographic solution. Bridle (2016), advises "Strategies for model building include picking a consistent refractor and averaging all shallow layers as a single weathering layer." In other words, it is advisable to pick the shingling and combine the shingles into a single "refractor", then also pick a deeper, outer refractor and finally combine them into a delay-time model.

There is a need for improved methods for seismic imaging in the presence of stringers or shingles in the near surface, low-velocity, "weathered" layer.

SUMMARY

One aspect of the present disclosure is a method for weathered layer correction of seismic data. A method according to the present disclosure includes identifying arrival times in the seismic data corresponding to a weathered layer velocity gradient. A velocity model of the weathered layer is generated using the arrival times. The seismic data are time adjusted using the velocity model.

A computer program according to another aspect of this disclosure may be stored in a non-transitory computer readable medium. The program comprises logic operable to cause a programmable computer to perform acts comprising the following. Signals detected by a plurality of seismic sensors disposed in a selected pattern above an area of subsurface to be evaluated are accepted as input to the computer. In the computer, arrival times in the seismic signals corresponding to a weathered layer velocity gradient are identified. A velocity model of the weathered layer is generated in the computer using the arrival times. In the computer, the detected seismic signals are time adjusted using the velocity model.

A method for seismic surveying according to another aspect of the present disclosure includes deploying a plurality of seismic sensors in a selected pattern above an area of subsurface to be evaluated. A seismic energy source is actuated. Seismic energy is detected by each of the plurality of seismic sensors in response to energy imparted into the areas of the subsurface by the seismic energy source. In signals generated by the plurality of seismic sensors in response to the detected seismic energy, arrival times are identified in the seismic data corresponding to a weathered layer velocity gradient. A velocity model of the weathered layer is generated using the arrival times. The signals are time adjusted using the velocity model.

In some embodiments, the identifying arrivals comprises arranging the seismic data into a common shot, a common receiver or a common midpoint gather.

Some embodiments further comprise applying linear moveout to the common shot or common receiver or common midpoint gather.

In some embodiments, generating a velocity model comprises applying turning-ray tomography to the arrival times.

Some embodiments further comprise applying moveout to a common shot gather, a common receiver or a common midpoint gather to substantially flatten turning ray arrival times.

Some embodiments further comprise using the generated velocity model in subsequent seismic processing.

In some embodiments, the subsequent seismic processing comprises at least one of pre-stack depth migration and full waveform inversion.

Other aspects and possible advantages will be apparent from the description and claims that follow.

DETAILED DESCRIPTION

Figure 4:
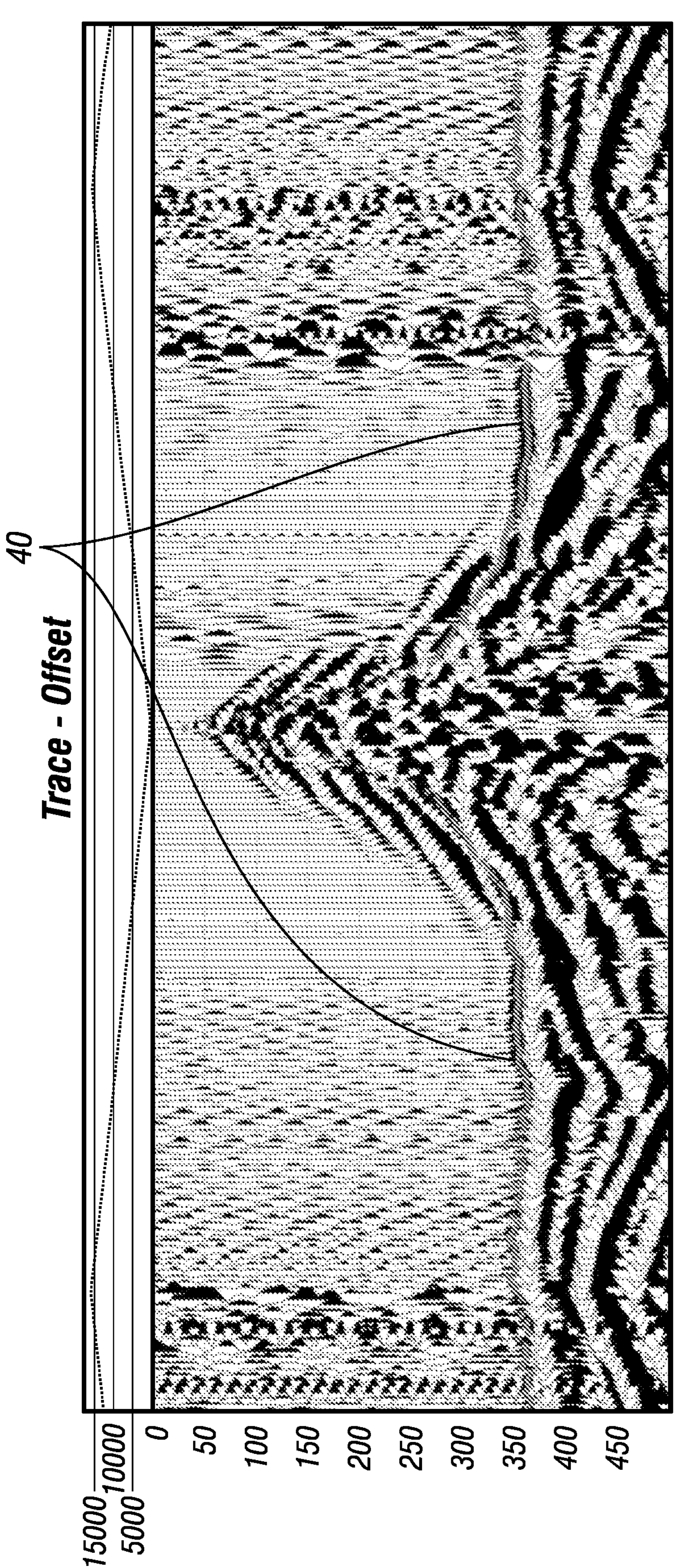
FIG. 4 shows the same seismic data as in FIG. 2, but with a velocity gradient event (e.g., near the bottom of the weathered layer) identified.
Figure 4A:
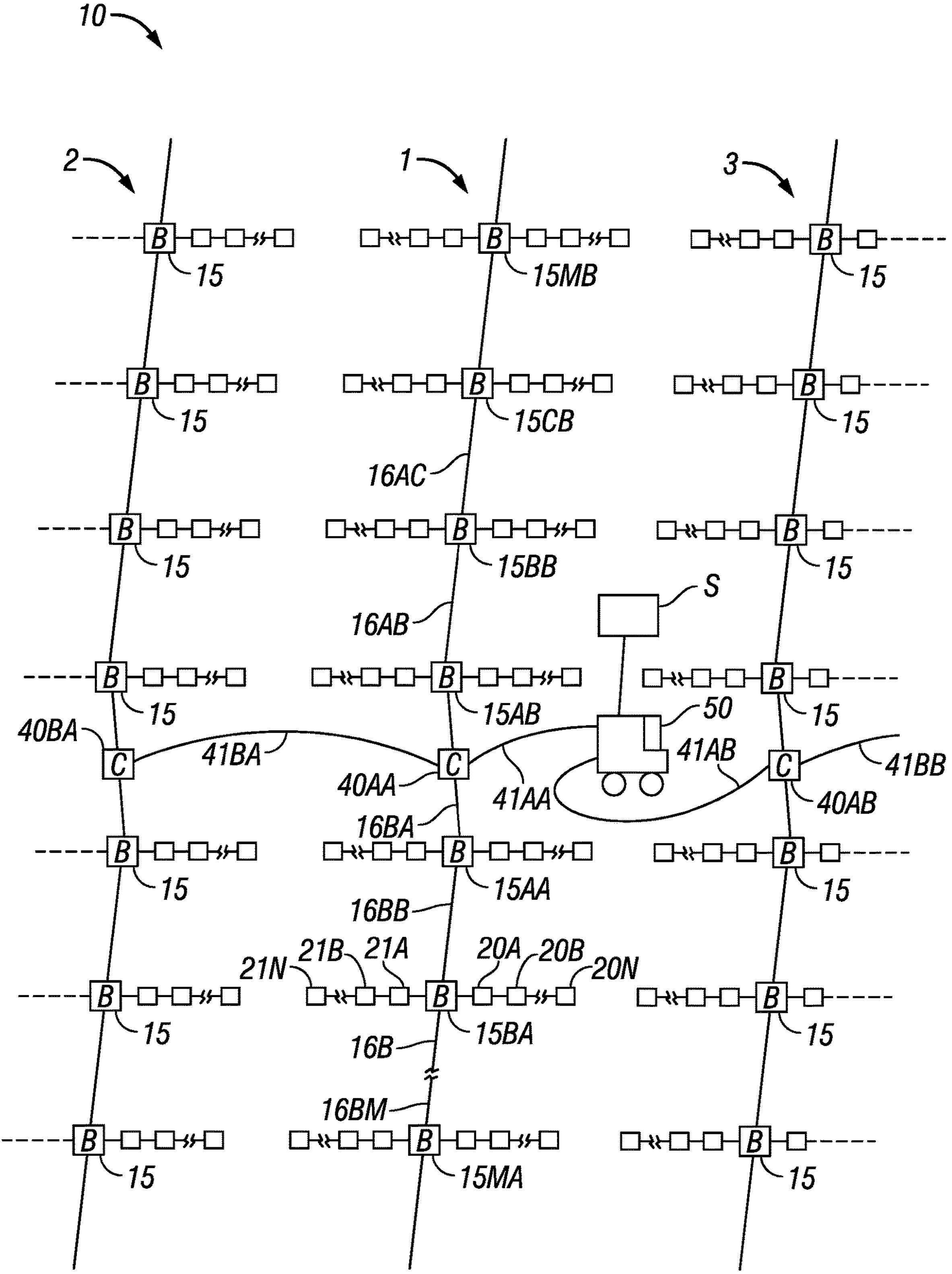
FIG. 4A shows an example equipment arrangement for acquiring seismic data that may be used in some embodiments.

Seismic signals that may be processed in accordance with various aspects of the present disclosure may be acquired using equipment such as shown in FIG. 4A. The equipment configuration may be referred to as a "spread" and is shown generally at 10. A recording unit 50 may be located at any topographically convenient position on the earth's surface relative to the spread 10. The recording unit 50 may include a digital data recorder (not shown separately) capable of simultaneous recording of digital signal samples from a plurality of separate seismic sensors, referred to as "channels." Each channel represents signals generated by an individual seismic sensor in response to seismic energy imparted into the Earth by one or more seismic energy sources S. The source S, which is shown only schematically for clarity, may be any type of seismic energy source known in the art, including, without limitation, vibrator(s), explosives, air guns or water guns, or arrays of such guns and/or vibrators. The seismic sensors can be any type known in the art such as geophones, strings of geophones wired serially, or hydrophones. Another type of seismic sensor is a so-called three-component geophone, which includes three, orthogonally positioned geophones each arranged to respond to sensor motion along only one sensitive axis. Each of the three sensors in a three-component geophone may be connected a corresponding individual signal channel.

The recording unit 50 may further include equipment for controllably initiating the seismic energy source S. "Grids" or "lines" of seismic sensors which cover a predetermined area or traverse on the ground surface (or on the sea bottom in shallow marine surveys, for example) can be positioned within any geometric pattern the system operator determines is suitable in order to conduct the seismic survey. Methods for determining the geometric pattern of seismic sensors are known in the art. For example, a first grid, indicated at 1, positioned approximately in the center of FIG. 4A, is shown extending from near the top to near the bottom of FIG. 4A. The first grid 1 may be linked to the recording unit 50 by a dual-channel optical fiber 41AA, hereinafter referred to as a "C-link." Seismic signal data generated by the seismic sensors within the first grid 1 may be ultimately conducted, as will be explained, to a data buffering unit, called a "C-unit" and generally shown at 40AA.

The C-unit 40AA can receive digital seismic signal data from two, dual-channel optical fibers, such as those shown at 16AB and 16BA and hereinafter referred to as "B-links", for buffering and retransmission of signals sent by a so-called "B-unit" (such as one shown at 15AA), to the recording unit 50 over the C-link 41AA. In some embodiments, the digital bit-rate on the C-link may be about twice that of signals received over the B-links 16AB, 16BA. The B-links 16AB, 16BA may also be used for transmitting command signals generated by the recording unit 50, through the C-unit 40AA to the B-units.

The C-unit 40AA may also receive and buffer digital seismic signal data from other C-units, such as one shown for example at 40BA and forming the central data buffering and re-transmission unit for a second grid shown generally at 2. The C-unit 40AA in the first grid 1 receives digitized seismic signals from the C-unit 40BA of the second grid 2, over another C-link, shown as 41BA, which may be substantially identical to the C-link 41AA connecting the C-unit 40AA of the first grid 1 to the recording unit 50. Similarly, the C-unit 40BA of the second grid 2, can receive digitized seismic signals from still other grids (not shown) for eventual retransmission to the C-unit 40AA of the first grid 1, and ultimately to the recording unit 50. The connection to the C-units (not shown) of other grids (not shown) are made over other C-links, such as one shown at 41CA.

The recording unit 50 may receive digitized seismic signals simultaneously from two separate C-links, the second C-link shown generally at 41AB and being itself connected to a C-unit 40AB forming the central buffering and retransmission unit for a third grid, shown generally at 3.

The structure of the individual grids, such as the first grid 1, includes at least one, and may include a plurality of the B-units. B-units are shown generally at 15AA through 15MA for those B-units in the first grid 1 shown below the C-unit 40AA in FIG. 4A. B-units are also shown generally at 15AB through 15MB for the B-units in the first grid 1 shown positioned above the C-unit 40AA in FIG. 4A. The B-units 15AA, 15BA which are closest to the C-unit 40AA, are connected to the C-unit 40AA, as previously explained, by the dual-channel optical fiber link called a "B-link", shown as 16AA and 16BA, respectively. The B-units 15AB, 15BB may receive command signals in optical telemetry conducted through the C-units from the recording unit 50 and reformat the command signals into electrical telemetry command signals provided to operate signal processing units, called A-units (shown in FIG. 4A as 21A through 21N).

The B-units, such as 15AB and 15BB, may be interconnected to the closest B-units 15AA, 15BA by other substantially identical B-links, shown generally at 16BB, 16AB. As will be further explained, each B-unit, such as 15AA, has enough internal data storage capacity to receive, buffer and retransmit digital signal from as many as 1,500 individual seismic sensor input channels. As will also be further explained, the B-units such as 15AA can be serially linked to each other by B-links into a series numbering twelve to thirteen of the B-units such as 15AA, depending on the sensor configuration geometry selected by the system operator and whether each B-unit is fully "loaded" with inputs from seismic sensors.

Each B-unit, such as 15AA, may be connected to the previously described A-units, shown for example at 21A through 21N as being connected to the B-unit 15BA. The A-units 21A through 21N, as will be further explained, each have three analog signal inputs (not shown in FIG. 4A). The analog signal inputs are typically connected to the seismic sensors. The A-units digitize electrical signals generated by the seismic sensors and transmit the digitized signals by electrical signal telemetry to the B-unit to which they are connected.

The A-units, such as 21A-21N, may be assembled serially into a "string" having a plurality of A-units. Each B-unit such as 15BA may accept input from up to two such "strings", the strings having a total number between them of as many as 80 of the A-units 21A-21N. As shown in FIG. 4A, both of the A-unit inputs on each B-unit, such as 15AA, are used in order to form a substantially symmetrical configuration of serially linked A-units (21A-21N, and also 20A-20N) provided to each A-unit input of the B-unit 15AA. In the spread 10 shown in FIG. 4A, the configuration of A-units 21A-21N and 20A-20N is repeated at each B-unit such as 15AA-15MA and 15AB-15MB, and that same pattern is repeated within each of the grids shown as 1, 2, and 3. The sensor configuration shown in FIG. 4A is not exclusive.

The previously described seismic sensors (not shown separately for clarity of the illustration) may be connected to analog signal inputs (not shown for clarity) on the A-units 20A-20N. The seismic sensors are positioned in a pattern which can be determined by methods known in the art.

In a typical seismic survey, the seismic energy source S may be initiated by a control signal from the recording unit 50, as previously stated. Acoustic energy radiates into the earth, whereupon some of the acoustic energy can be reflected from acoustic impedance changes which may be present at various depths within the earth. The reflected acoustic energy propagates back to the earth's surface where it can be detected by the seismic sensors (not shown) connected to each of the A-units (such as 21A-21N). Signals generated by the sensors in response to the detected acoustic energy may be digitized in the A-units. The digitized signals from the A-units are transmitted electrically to the B-units. The B-units, as will be further explained, convert the electrical signals of the A-units into optical signals for retransmission, either directly to the recording unit 50, or alternatively to a C-unit. If the optical signals are retransmitted to a C-unit, then within the C-unit the signals can be combined with optical telemetry signals from other C-units for eventual retransmission to the recording unit 50. The recording unit 50 may generate a digital record of sensor signal amplitude, with respect to time, for each one of the sensor signals input to each A-unit.

The seismic acquisition system shown in FIG. 4A is only one example of seismic acquisition systems that may be used to obtain seismic data in accordance with the present disclosure and is not intended to limit the scope of the present disclosure.

Figure 1:
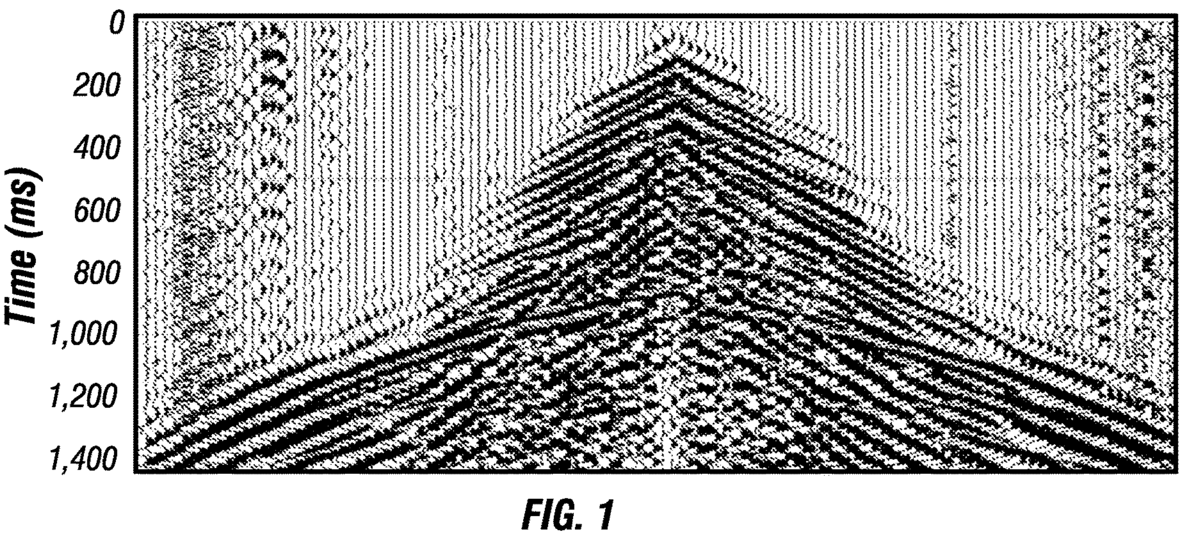
FIG. 1 shows an example of a seismic trace gather exhibiting a "Christmas-tree" pattern of shingles.
Figure 2:
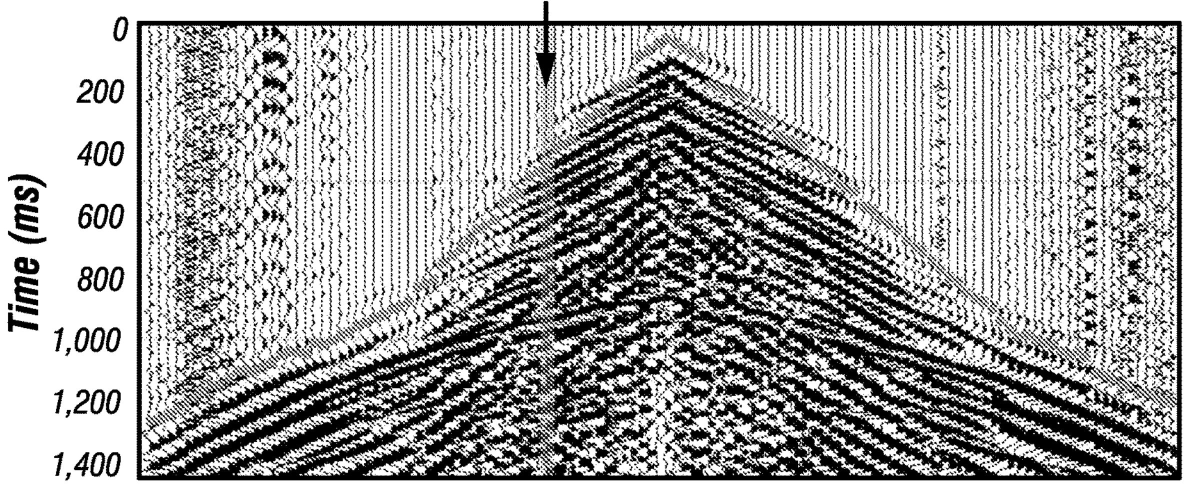
FIG. 2 shows the common shot gather shown in FIG. 1 with shingling identified by arrival time of an event in the traces of the gather.
Figure 3:
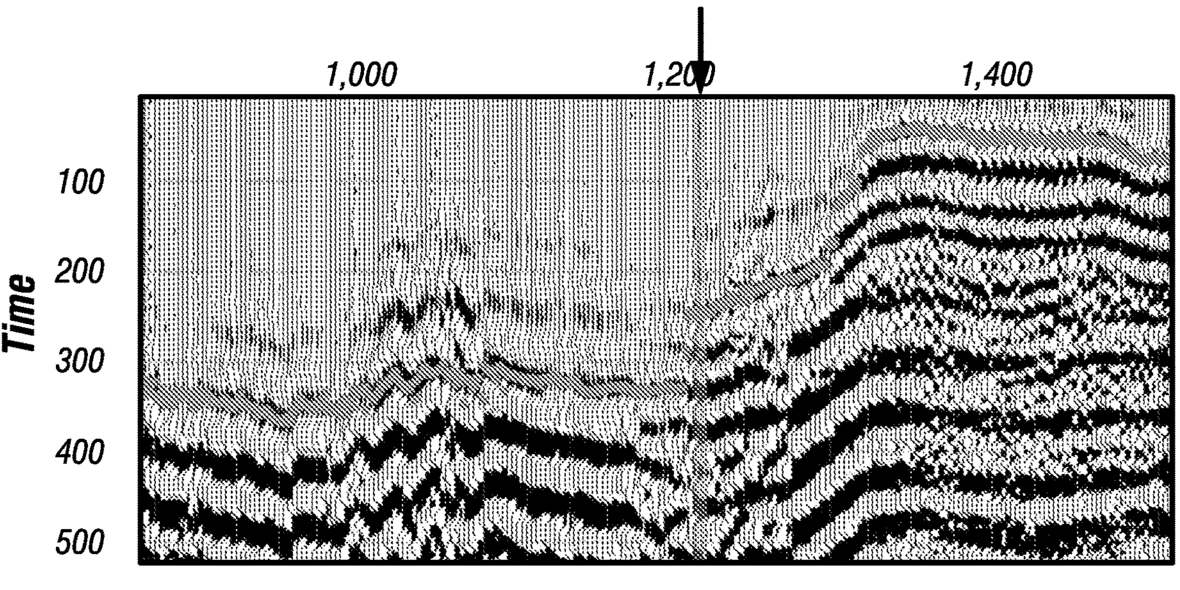
FIG. 3 shows the same seismic data of FIG. 2 rearranged into a "common offset" gather.

A method according to the present disclosure may be referred to as "VwGradient" picking, where Vw represents "weathering velocity", that is, the seismic velocity of the weathered layer near the surface, which may be modeled as a continuum of formations having monotonically increasing seismic velocity with respect to depth. In such methods, an event is identified (picked) beneath, that is, at greater arrival time, than events identified as shingles. The method comprises picking an event corresponding to a "velocity gradient" as shown in FIG. 4. FIG. 4 shows the same seismic data as in FIG. 2, but with a velocity gradient event (e.g., near the bottom of the weathered layer) identified at 40.

Figure 5:
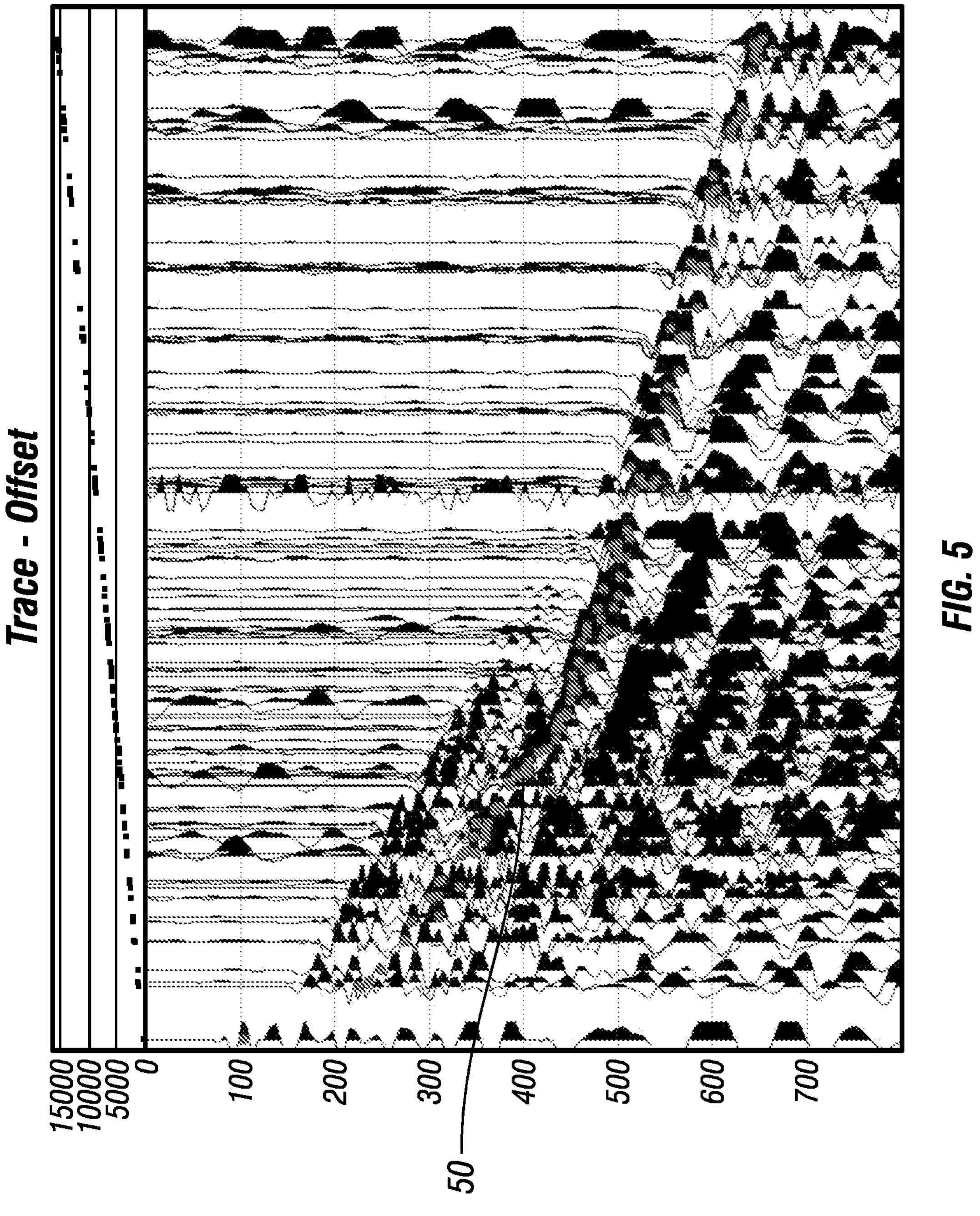
FIG. 5 shows another common shot gather ordered by offset.

FIG. 5 shows another common shot gather ordered by offset. Gathers ordered by offset may be a more useful organization of the seismic data for observing and identifying the gradient than other presentations of seismic data. In FIG. 5, the shingling is observable as a well-defined "first break" (earliest substantially time-contiguous event), but the gradient beneath is readily identifiable at 50, even though it is not a first break.

Figure 6:
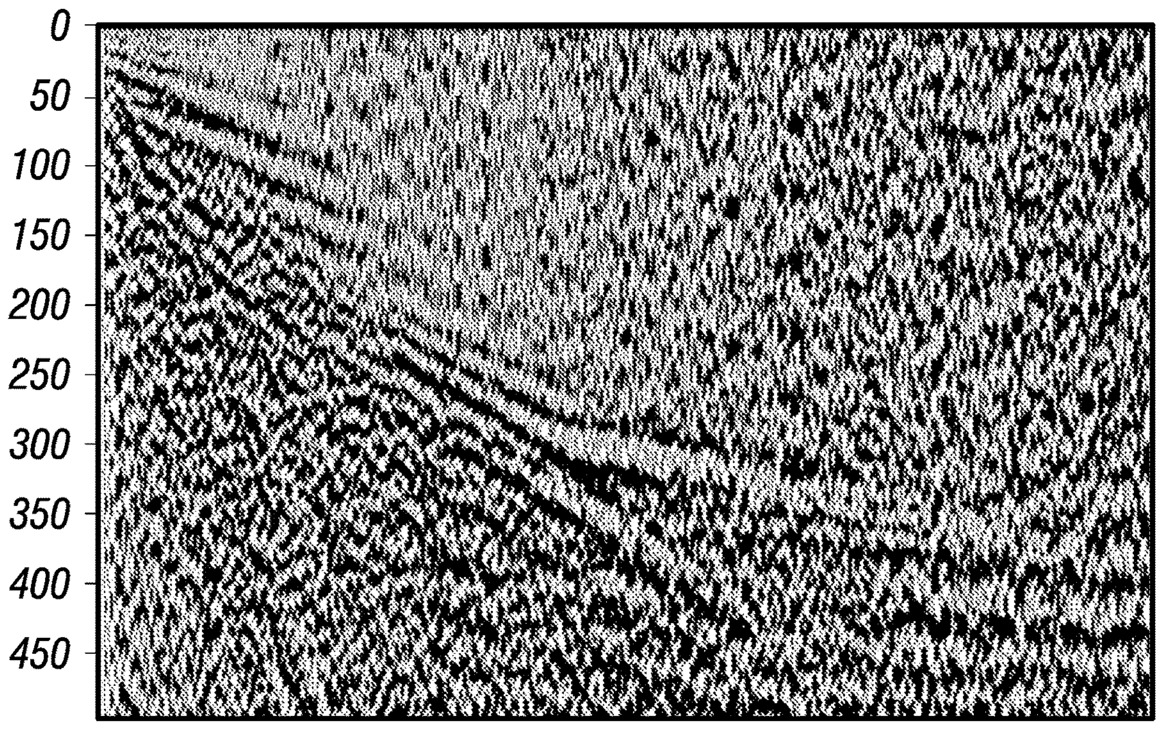
FIG. 6 shows a common shot gather with multiple shingled events identifiable and a VwGradient event.
Figure 7:
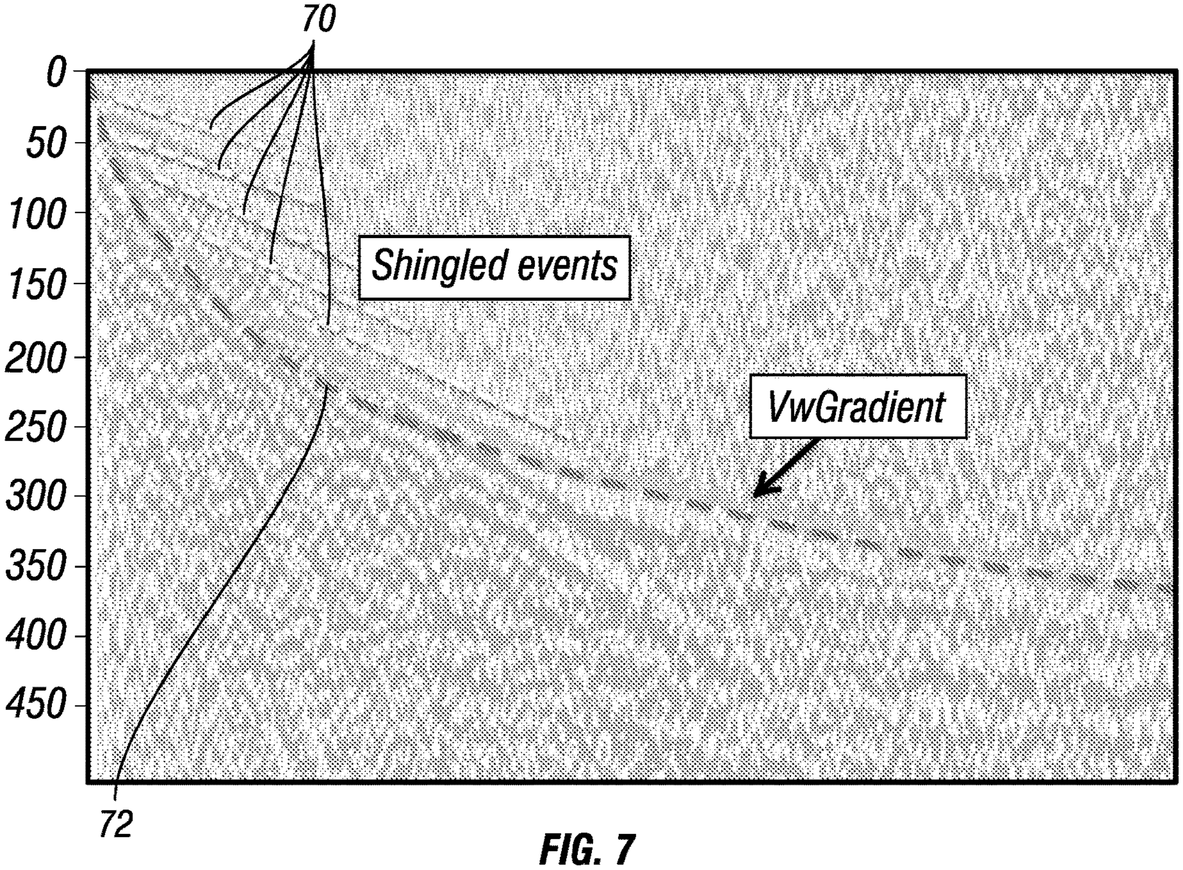
FIG. 7 shows the gather of FIG. 6 wherein how to identify certain events is illustrated.
Figure 8:
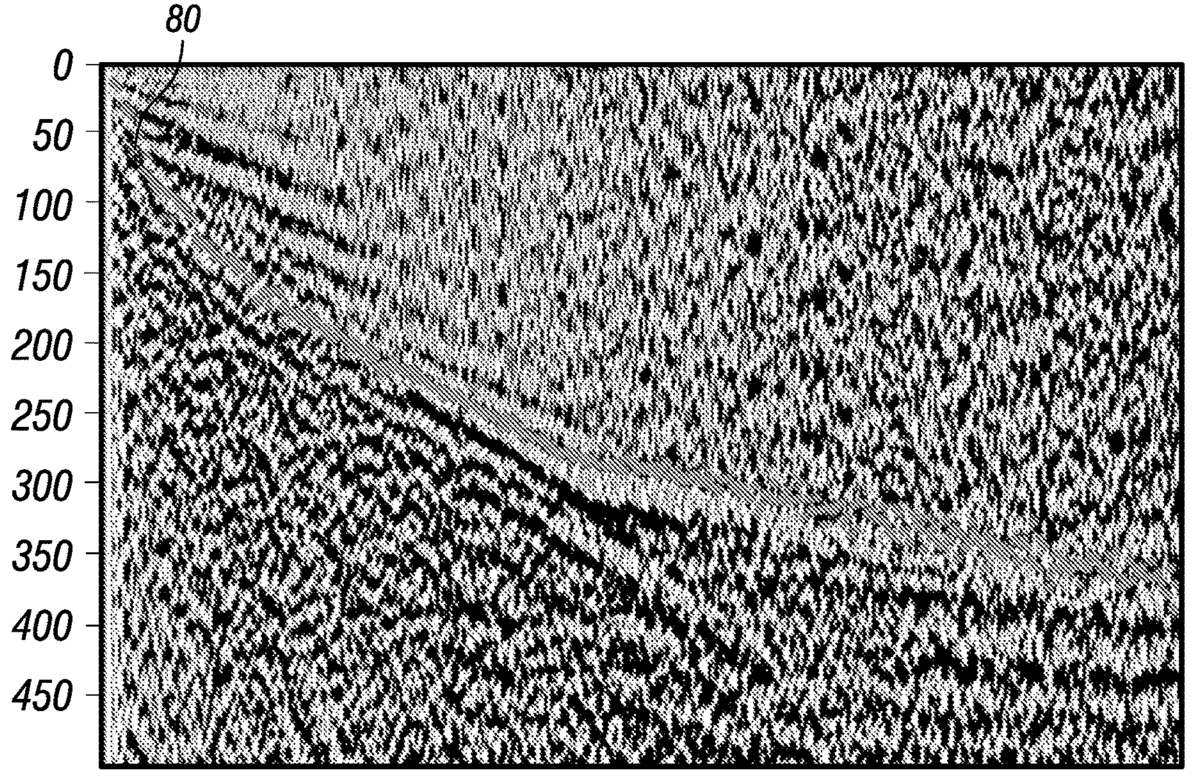
FIG. 8 shows the common shot gather of FIG. 6 wherein the VwGradient event is identified.

FIG. 6 shows a common shot gather which exhibits multiple shingled events identifiable and a VwGradient event. FIG. 7 shows the same common shot gather shown in FIG. 6, wherein shingling events are identified at 70, and a VwGradient event is identified at 72. FIG. 8 shows the common shot gather shown in FIG. 6 wherein the VwGradient event is identified at 80.

In some embodiments, shingling events may be identified by a linear moveout characteristic, that is, a substantially linear increase in arrival time of shingling events with respect to offset (seismic source to receiver distance). VwGradient events may exhibit non-linear, e.g., curved moveout characteristics.

Figure 9:
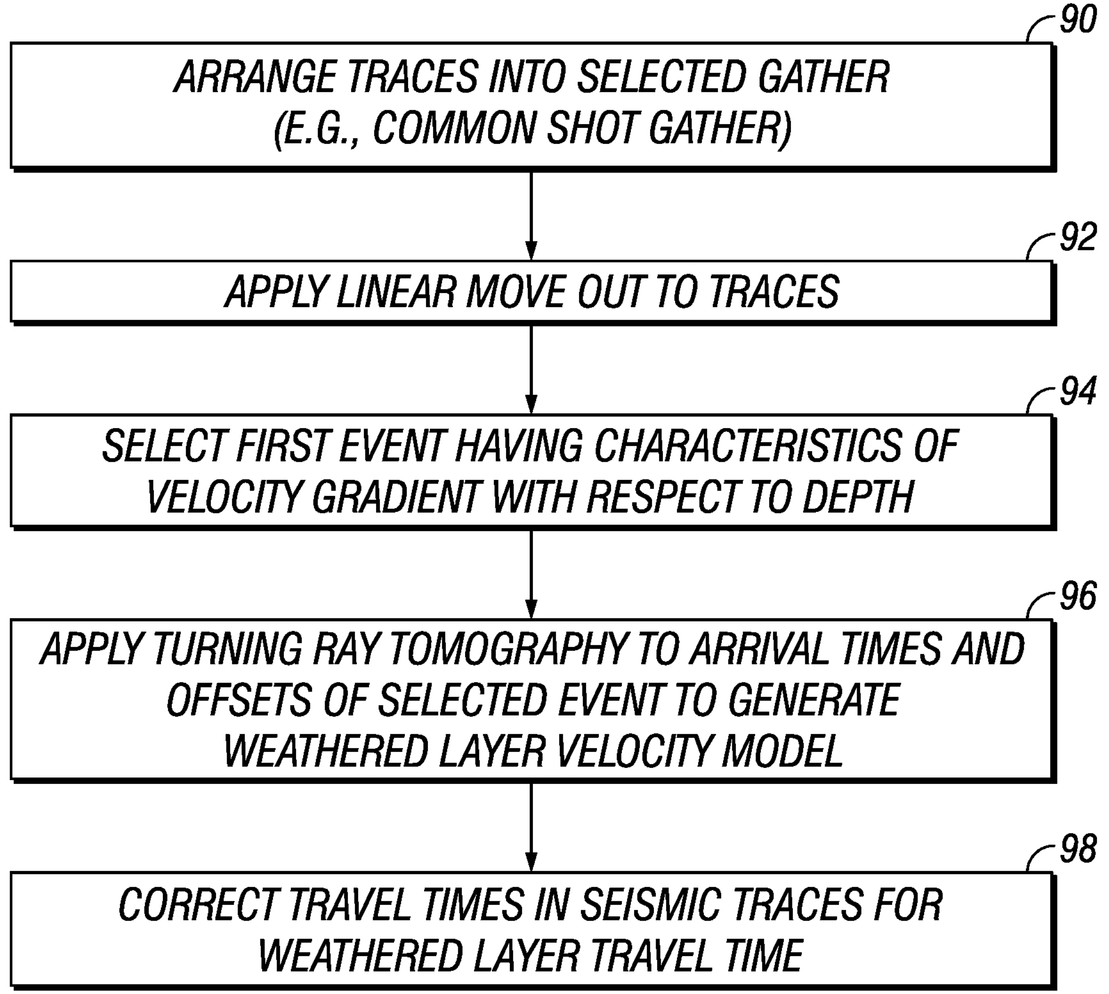
FIG. 9 shows a flow chart of an example embodiment of a method according to the present disclosure.

An example embodiment of a method according to the present disclosure may comprise, and referring to FIG. 9, at 90, a trace gather for one or more actuations (shots) of a seismic energy source may be generated. The trace gather may start at zero offset (source to receiver distance) and zero elapsed time from source actuation, although the specific minimum offset and starting time are not limitations on the scope of the present disclosure. Any form of trace gather may be used. For convenience, it has been determined that common shot gathers may be more readily interpreted than other forms of shot gathers.

At 92, linear moveout is applied to the traces in the gather. Linear moveout means to shift traces linearly at a constant velocity according to their respective receiver distances from the seismic source. Applying linear moveout may facilitate selecting a gradient event in the trace gather. A velocity used to calculate linear moveout time correction may be chosen so that an event in the trace gather not resulting from shingles may appear substantially time flat (zero change in event time) with respect to offset. Applying linear moveout is an optional step in the method, and may be performed only for the purpose of facilitating identification of the gradient event.

At 94, a first event (in time) in the trace gather having characteristics of a seismic velocity gradient (monotonically increasing velocity with respect to depth) may be identified in the trace gather. The identified "gradient" event will produce a set of event arrival times with respect to offset. The gradient event may correspond to the base of the weathered layer. Identifying the gradient event may be performed by machine or visually by a human operator.

At 96, turning ray tomography is applied to the set of arrival times and offsets for each trace gather in which the gradient event has been identified. The result of turning ray tomography is a velocity model representing seismic velocity with respect to time and/or depth in the subsurface from the ground level to the time/depth of the event in the gather identified as the gradient event. The turning ray tomography model may be expressed as velocity varying with depth relative to the source and the receiver position along the surface.

At 98, the velocity model generated at 96 may be used to calculate time corrections for the seismic signals detected at each receiver. Such time corrections may be applied to the signals at each receiver, whereby time-corrected signals may be used in any later seismic data processing known in the art.

Figure 10:
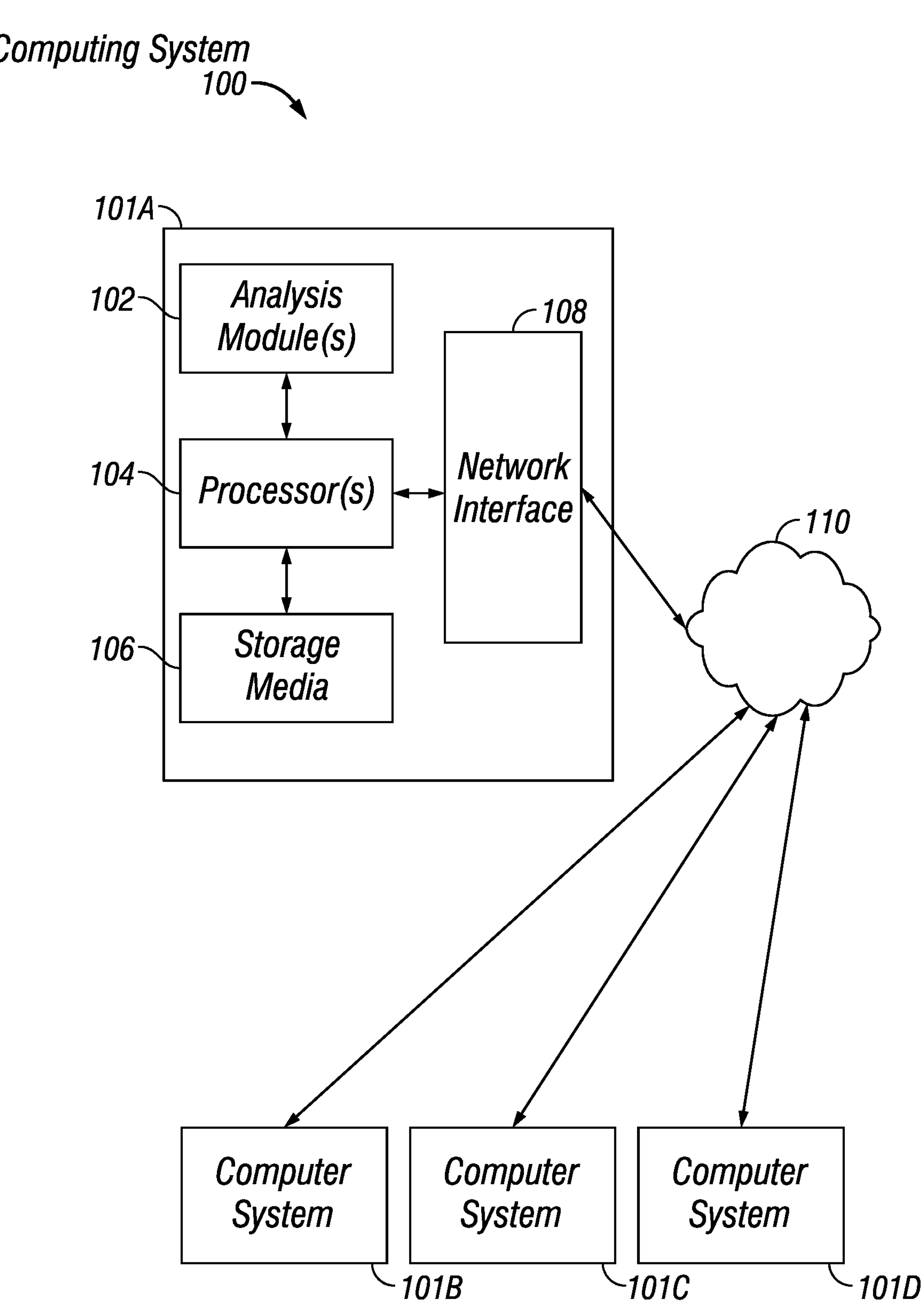
FIG. 10 shows an example embodiment of a computer system that may be used in some embodiments.

In one aspect of the present disclosure, a computer or computing system may be programmed to perform seismic signal processing as explained with reference to FIG. 9. A computer program may be stored in non-transitory computer readable media, and cause a programmable computer or computing system to perform the method. FIG. 10 shows an example computing system 100 in accordance with some embodiments. The computing system 100 may be an individual computer system 101A or an arrangement of distributed computer systems. The individual computer system 101A may include one or more analysis modules 102 that may be configured to perform various tasks according to some embodiments, such as the tasks explained with reference to FIG. 10. To perform these various tasks, the analysis module 102 may operate independently or in coordination with one or more processors 104, which may be connected to one or more storage media 106. A display device 105 such as a graphic user interface of any known type may be in signal communication with the processor 104 to enable user entry of commands and/or data and to display results of execution of a set of instructions according to the present disclosure.

The processor(s) 104 may also be connected to a network interface 108 to allow the individual computer system 101A to communicate over a data network 110 with one or more additional individual computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. 10 the storage media 106 are shown as being disposed within the individual computer system 101A, in some embodiments, the storage media 106 may be distributed within and/or across multiple internal and/or external enclosures of the individual computing system 101A and/or additional computing systems, e.g., 101B, 101C, 101D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that any other embodiment of a computing system may have more or fewer components than shown, may combine additional components not shown in the example embodiment of FIG. 10, and/or the computing system 100 may have a different configuration or arrangement of the components shown in FIG. 10. The various components shown in FIG. 10 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

REFERENCES

"Recognizing shingling seismic data by unsupervised machine learning" Mengyao Sun*, Jie Zhang, Yihao Wang, University of Science and Technology of China (USTC), 2018, SEG.

"Understanding of the first arrivals in the shape of a Christmas tree", Mengyao Sun and Jie Zhang, 2013, SEG "Application of deep near-surface refraction static model to Permian data", Diggins, C., 2016.

"Significance and implications of shingling in refraction records", R. Cassinis, L. Borgonovi, 1966, EAGE "Hidden layer problem in seismic refraction work", Banerjee, B., Gupta, S. K., Geophysical Prospecting, Vol 23, No 4, 1975, pp. 642-652

What is claimed is:

1. A method for weathered layer correction of seismic data, comprising:

identifying arrival times in the seismic data corresponding to a velocity gradient in a weathered layer, the seismic data comprising signals detected by a plurality of seismic sensors disposed in a selected pattern above an area of subsurface to be evaluated;

the arrival times corresponding to events having monotonically increasing velocity with respect to depth, the arrival times being greater than events having linear moveout with respect to offset;

generating a velocity model of the weathered layer using the arrival times; and time adjusting the seismic data using the velocity model.

2. The method of claim 1 wherein the identifying arrivals comprises arranging the seismic data into a common shot gather, a common receiver gather or a common midpoint gather.

3. The method of claim 2 further comprising applying linear moveout to the common shot or common receiver or common midpoint gather.

4. The method of claim 2 further comprising applying moveout to a common shot gather, a common receiver or a common midpoint gather to substantially flatten turning ray arrival times.

5. The method of claim 1 wherein the generating a velocity model comprises applying turning ray tomography to the arrival times.

6. The method of claim 1 further comprising using the generated velocity model in subsequent seismic processing.

7. The method of claim 6 wherein the subsequent seismic processing comprises at least one of pre-stack depth migration and full waveform inversion.

8. A computer program stored in a non-transitory computer readable medium, the program comprising logic operable to cause a programmable computer to perform acts comprising:

accepting as input to the computer signals detected by a plurality of seismic sensors disposed in a selected pattern above an area of subsurface to be evaluated;

in the computer, identifying arrival times in the seismic signals corresponding to a velocity gradient in a weathered layer, the arrival times corresponding to events having monotonically increasing velocity with respect to depth, the arrival times being greater than events having linear moveout with respect to offset;

in the computer, generating a velocity model of the weathered layer using the arrival times; and in the computer, time adjusting the seismic signals using the velocity model.

9. The computer program of claim 8 wherein the identifying arrivals comprises arranging the seismic data into a common shot gather, a common receiver gather or a common midpoint gather.

10. The computer program of claim 9 further comprising applying linear moveout to the common shot or common receiver or common midpoint gather.

11. The computer program of claim 9 further comprising applying moveout to a common shot gather, a common receiver or a common midpoint gather to substantially flatten turning ray arrival times.

12. The computer program of claim 8 wherein the generating a velocity model comprises applying turning ray tomography to the arrival times.

13. The computer program of claim 8 further comprising using the generated velocity model in subsequent seismic processing.

14. The computer program of claim 13 wherein the subsequent seismic processing comprises at least one of pre-stack depth migration and full waveform inversion.

15. A method for seismic surveying, comprising:

deploying a plurality of seismic sensors in a selected pattern above an area of subsurface to be evaluated;

actuating a seismic energy source;

detecting seismic energy at each of the plurality of seismic sensors in response to energy imparted into the areas of the subsurface by the seismic energy source;

in signals generated by the plurality of seismic sensors in response to the detected seismic energy, identifying arrival times in the seismic data corresponding to a weathered layer velocity gradient, the arrival times corresponding to events having monotonically increasing velocity with respect to depth, the arrival times being greater than events having linear moveout with respect to offset;

generating a velocity model of the weathered layer using the arrival times; and time adjusting the seismic data using the velocity model.

16. The method of claim 15 wherein the identifying arrivals comprises arranging the seismic data into a common shot gather, a common receiver gather or a common midpoint gather.

17. The method of claim 16 further comprising applying linear moveout to the common shot or common receiver or common midpoint gather.

18. The method of claim 16 further comprising applying moveout to a common shot gather, a common receiver or a common midpoint gather to substantially flatten turning ray arrival times.

19. The method of claim 15 wherein the generating a velocity model comprises applying turning ray tomography to the arrival times.

20. The method of claim 15 further comprising using the generated velocity model in subsequent seismic processing.

21. The method of claim 20 wherein the subsequent seismic processing comprises at least one of pre-stack depth migration and full waveform inversion.

* * * * *